United States Patent
Campagnolo

(10) Patent No.: US 6,923,355 B2
(45) Date of Patent: Aug. 2, 2005

(54) ELECTRONIC CONTROL CONTAINMENT UNIT FOR BICYCLES

(75) Inventor: Valentino Campagnolo, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 09/850,069

(22) Filed: May 8, 2001

(65) Prior Publication Data

US 2001/0042767 A1 Nov. 22, 2001

(30) Foreign Application Priority Data

May 9, 2000 (IT) ...................................... TO2000A0430

(51) Int. Cl.⁷ ................................................ B62J 11/00
(52) U.S. Cl. ........................ 224/414; 224/425; 224/431; 224/462; 224/902; 224/926; 224/929
(58) Field of Search ............................... 224/412, 414, 224/419, 425, 428, 431, 440, 456, 461, 462, 902, 926, 929, 429; 248/311.2

(56) References Cited

U.S. PATENT DOCUMENTS

| | | | |
|---|---|---|---|
| 675,390 A | 6/1901 | Keating | |
| 1,439,430 A | 12/1922 | Lyhne | |
| 3,995,491 A | 12/1976 | Wolfla, II | |
| 4,780,864 A | 10/1988 | Houlihan | |
| 4,948,080 A | * 8/1990 | Jack | 224/414 |
| 5,170,981 A | * 12/1992 | Lin | 224/414 |
| 5,177,432 A | 1/1993 | Waterhouse et al. | |
| 5,199,619 A | * 4/1993 | Mostashari | 224/414 |
| 5,217,116 A | * 6/1993 | Ku | 206/374 |
| 5,276,593 A | 1/1994 | Lighthill et al. | |
| 5,423,509 A | * 6/1995 | LaPorte et al. | 224/414 |
| 5,570,752 A | 11/1996 | Takata | |
| 5,597,225 A | * 1/1997 | Davis | 224/414 |
| 5,803,328 A | * 9/1998 | Nakahara | 224/414 |
| 5,839,709 A | * 11/1998 | Leonard | 248/311.2 |
| 6,095,270 A | * 8/2000 | Ishikawa | 180/220 |
| 6,286,982 B1 | 9/2001 | Tashiro | |
| 6,357,616 B1 | * 3/2002 | Harris et al. | 220/475 |
| 6,423,443 B1 | 7/2002 | Tsuboi et al. | |
| 2001/0042767 A1 | 11/2001 | Campagnolo | |
| 2002/0052258 A1 | 5/2002 | Meggiolan | |

FOREIGN PATENT DOCUMENTS

JP  020002193164  7/2002

* cited by examiner

Primary Examiner—Stephen K. Cronin
(74) Attorney, Agent, or Firm—Volpe and Koenig, P.C.

(57) ABSTRACT

A bottle-cage supporting unit for a bicycle includes a cage support for the bottle, associated to which are a container for an electronic control unit for a motor-driven gear-shifting system with which the bicycle is equipped and a container for the electric power-supply battery for the electronic control unit.

3 Claims, 6 Drawing Sheets

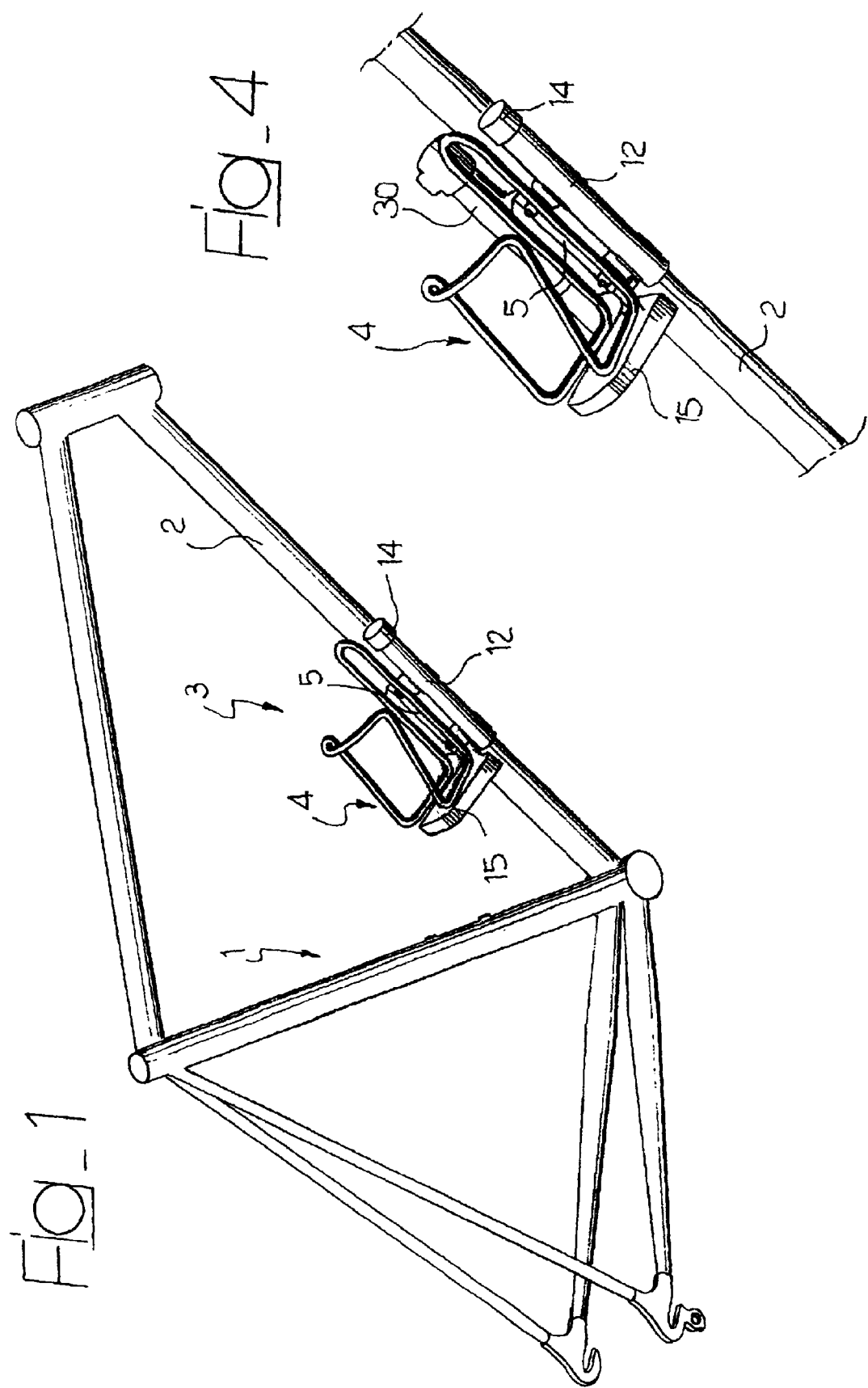

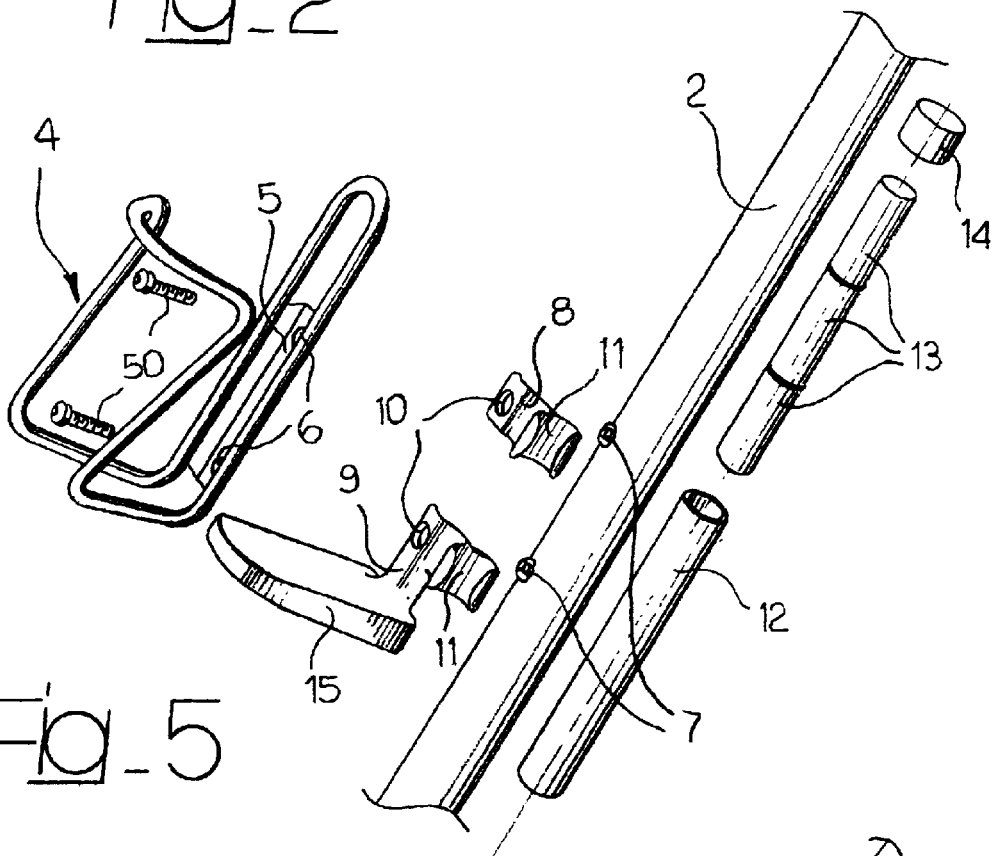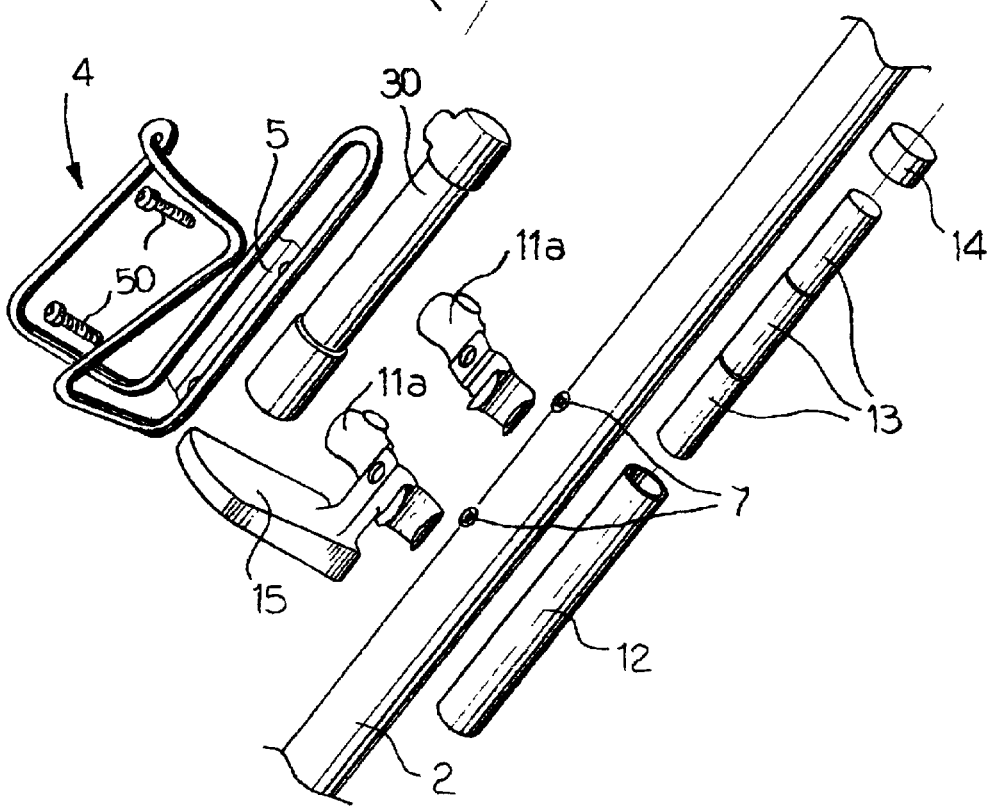

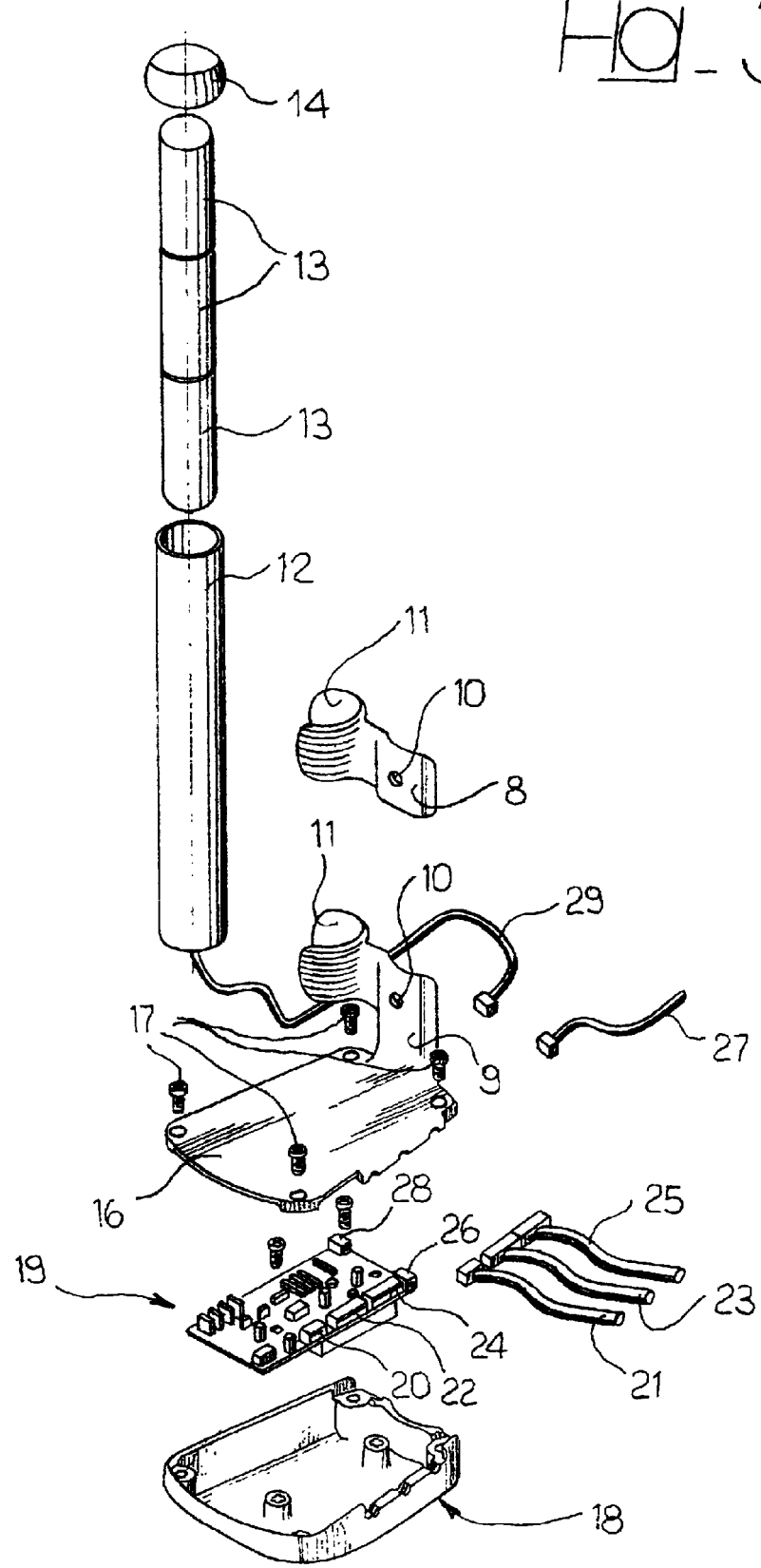

Fig_6
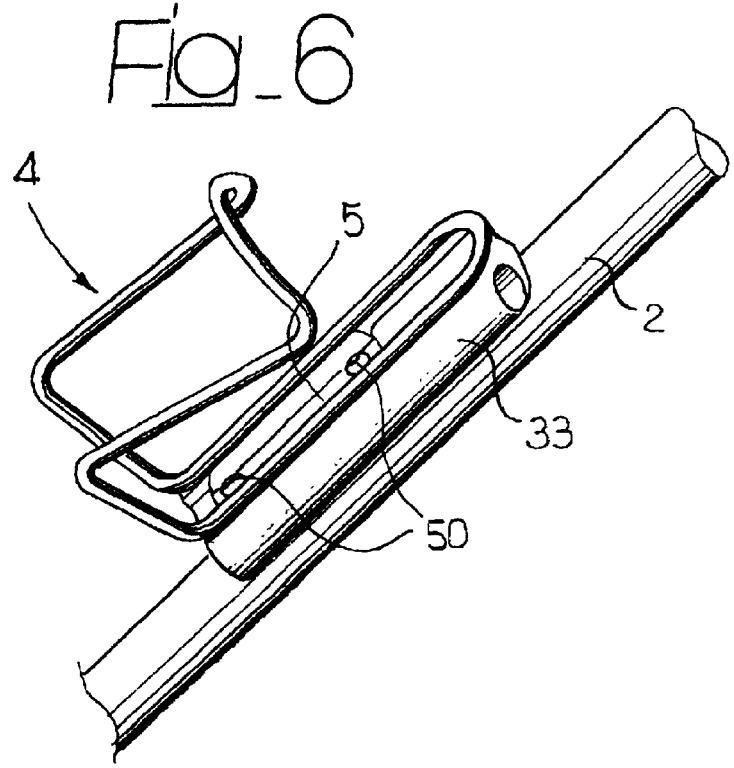
Fig_7
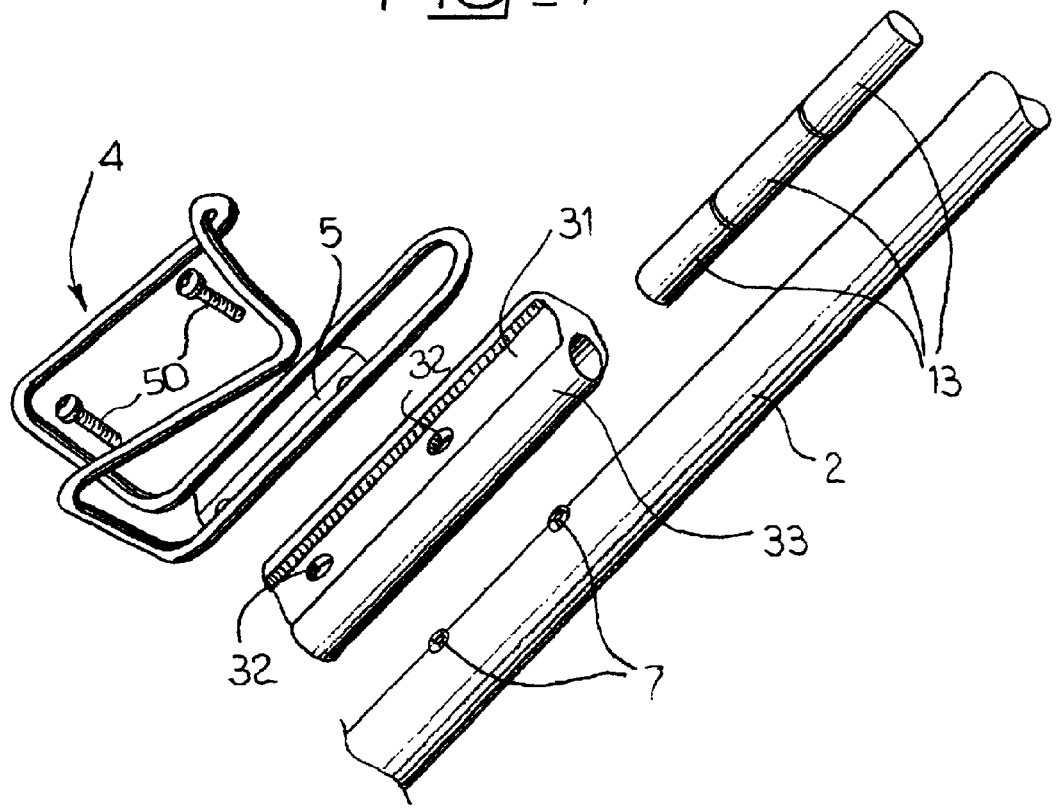

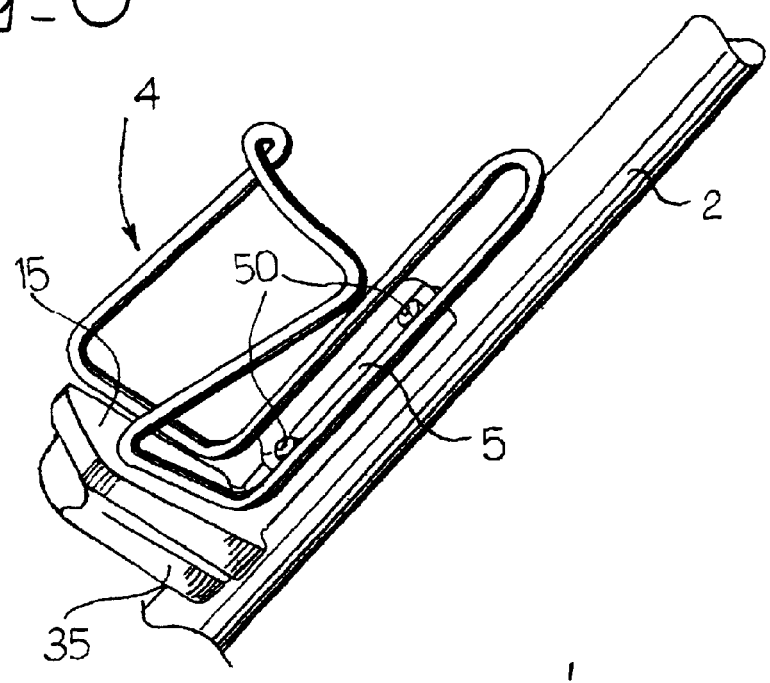
Fig_8
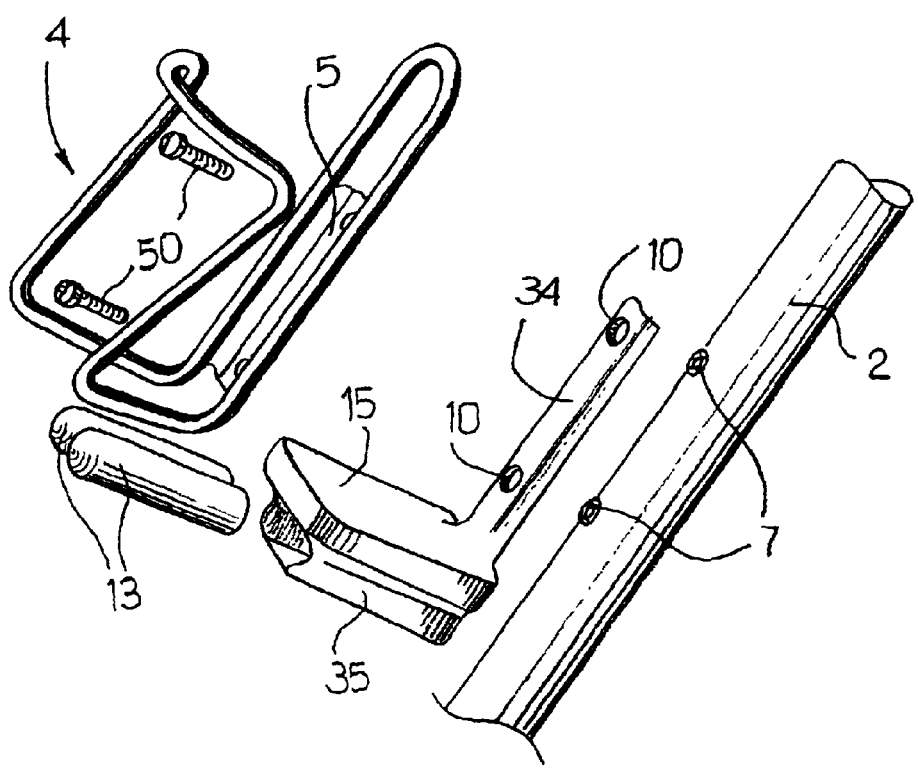
Fig_9

Fig_10
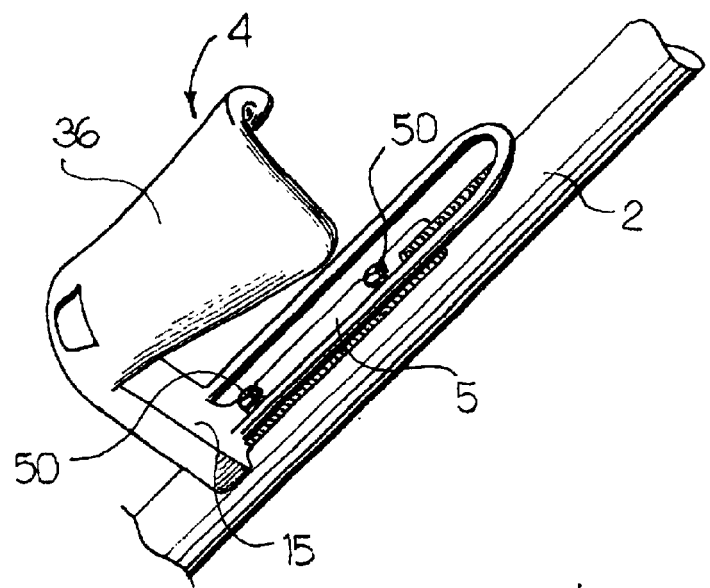
Fig_11
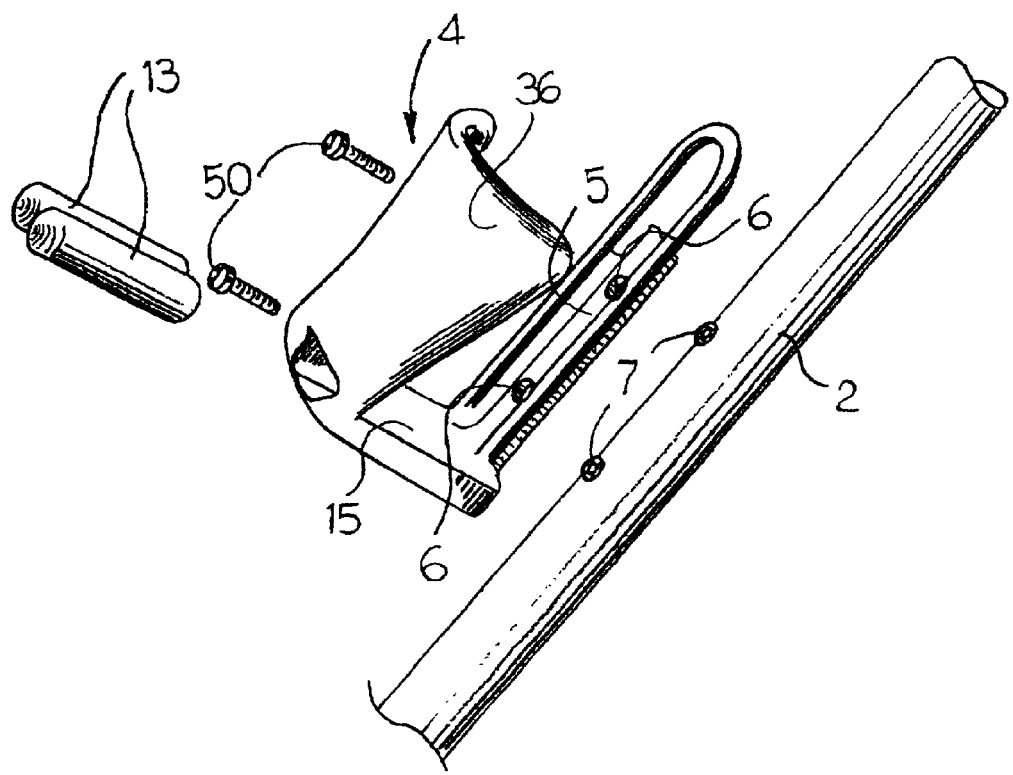

ELECTRONIC CONTROL CONTAINMENT UNIT FOR BICYCLES

BACKGROUND OF THE INVENTION

The present invention relates to bicycles of the type comprising a frame, a bottle-cage supporting unit fixed to the frame, at least one electronic control device on board the bicycle, and an electronic control and/or power-supply system for said electronic device.

The use of an electronic control and/or power-supply system on board a bicycle has already been proposed in the past, with particular reference to bicycles provided with electronically controlled motor-driven gear change. An example of solutions of this sort is described and illustrated in the U.S. Pat. No. 5,470,277 filed by the present applicant. For bicycles of the above type there exists the need to have available a housing for the electronic control unit that does not hinder normal use of the bicycle and at the same time enables access for possible replacement or for maintenance operations in an easy and fast way.

SUMMARY OF THE INVENTION

With a view to solving the above problem in an efficient way, the subject of the present invention is a containment unit for an electronic control and/or power-supply system in a bicycle of the type specified previously, characterized in that the aforesaid containment unit for the electronic control and/or power-supply system has a conformation designed for being fixed to the bicycle frame in the same point where the bottle-cage supporting unit is fixed.

In a preferred embodiment, the aforesaid containment unit comprises a container for at least one electronic control card and an auxiliary container for an electric power-supply battery. In a preferred embodiment, the aforesaid containment unit can be fixed to the frame of the bicycle using the same fixing means as those that secure the bottle-cage supporting unit to the bicycle.

The invention envisages various embodiments of the general idea of solution described above. For example, in a first embodiment, the bottle-cage support includes a supporting plate which can be fixed to a tube of the bicycle frame, typically the down tube, and moreover includes auxiliary supporting means designed to be set between said supporting plate and the tube of the bicycle frame. In the latter case, the container for the electronic control unit is rigidly connected to the bottom end of said auxiliary means and projects in cantilever fashion therefrom beneath the space designed to receive the bottle.

Preferably, in the aforesaid embodiment, the auxiliary supporting means are provided laterally with elastic clips or clamps for anchoring an elongated sheath constituting the container for the electric power-supply battery. The same auxiliary plate can also be provided, on its side opposite to the one equipped with the aforesaid elastic clamps, with further clamps for anchorage of a pump for inflating the tires of the bicycle.

In a variant embodiment, the container for the electronic control unit has a flattened body designed to be set between the bottle-cage support and the tube of the frame of the bicycle. Preferably, the said flattened body has, on one of its sides, a sheath designed to receive the electric power-supply battery.

In a further variant embodiment, the container for the electronic control unit is set in a projecting position at the base of the bottle, as in the case of the first embodiment described previously, and moreover includes, beneath the aforesaid container, a further container for the electric power-supply battery.

Of course, a wide range of modifications are in any case possible to the examples of embodiment described above, without prejudice to the principle of arranging the container for the electronic control unit in association with the bottle-cage supporting unit, preferably using the same fixing screws that are used for fixing the bottle-cage supporting unit to the frame of the bicycle also for anchoring the container carrying the electronic control unit.

BRIEF DESCRIPTION OF THE DRAWINGS

Further characteristics and advantages of the present invention will emerge from the ensuing description, with reference to the attached drawings, which are provided purely by way of non-limiting examples and in which:

FIG. 1 is a perspective view of a first embodiment of the bottle-cage supporting unit according to the invention, in the condition where it is mounted on a bicycle frame;

FIG. 2 is an exploded perspective view of the unit of FIG. 1;

FIG. 3 is an exploded perspective view at an enlarged scale of the bottle-cage supporting unit of FIG. 1;

FIG. 4 is a perspective view of a second embodiment of the bottle-cage supporting unit according to the invention;

FIG. 5 is an exploded perspective view of the unit of FIG. 4;

FIGS. 6 and 7 are, respectively, a perspective view and an exploded perspective view of a third embodiment of the invention;

FIGS. 8 and 9 are, respectively, a perspective view and an exploded perspective view of a fourth embodiment; and FIGS. 10 and 11 are, respectively, a perspective view and an exploded perspective view of a fifth embodiment of the invention.

DETAILED DESCRIPTION OF THE INVENTION

With reference to FIGS. 1 and 2, the number 1 designates, as a whole, a bicycle frame of a type in itself known, including a down tube 2 to which a bottle-cage supporting unit 3 according to the present invention is fixed. In the example illustrated, the bottle-cage supporting unit 3 comprises a support 4 for the bottle (not illustrated) consisting of a bent metal wire rigidly connected to a supporting plate 5 provided with holes 6 for engagement of fixing screws 50 designed to engage corresponding holes 7 made in the down tube 2 or in any other tube of the bicycle frame. The bottle-cage supporting unit 4 moreover comprises a top auxiliary plate 8 and a bottom auxiliary plate 9 which are set between the plate 5 and the tube 2 of the frame and which have respective holes 10 for engagement of the same screws 50 that fix the plate 5 to the frame tube 2. In the example illustrated, both of the plates 8 and 9 are made of plastic material and incorporate, in a single piece, two respective clamps 11 for fixing a cylindrical sheath 12 which receives within it the electrical battery and which is provided with a closing lid 14. The bottom plate 9 is rigidly connected to a container 15 for an electronic control unit which is supplied by the battery 13 and which is associated to a motor-driven gear-shifting system with which the bicycle is equipped. The structure described above can be better seen in FIG. 3, where the container 15 is illustrated in the exploded condition, with the lid 16 made of a single piece of plastic material with the bottom plate 9. The lid 16 can be fixed by means of screws 17 to a tray-shaped body 18 made of plastic material which receives, inside it, the electronic control unit 19. The latter includes a connector 20 for a cable 21 designed to be connected to a pedalling-cadence sensor, with which the bicycle is provided, a connector 22 for a cable 23 designed to be connected to the electric motor for controlling the front derailleur of the bicycle, a connector 24 for a cable 25 designed to be connected to an electric motor for controlling the rear derailleur of the bicycle, a connector 26 for a cable 27 designed to be connected to the display unit mounted on the handlebars of the bicycle, and a connector 28 for a cable 29 connected to the battery 13 which is received inside the sheath 12.

Thanks to the structure and arrangement described above, the bottle-cage supporting unit according to the invention is able to perform the supplementary function of supporting the electronic control unit 19 and the corresponding power-supply battery 13. The said components are thus mounted on the bicycle in a position in which they do not in the least hinder normal use of the bicycle and in which they are, at the same time, immediately and readily accessible for a possible replacement or for maintenance operations.

FIGS. 4 and 5 illustrate a solution substantially identical to that of FIGS. 1-3, differing from the latter only in that the two auxiliary plates 8, 9 are provided on one side, with the two elastic clamps for supporting the container 12 of the electric power-supply batteries 13, and on the other side with two elastic clamps 11a for supporting a manual pump 30, of any known type, usable for inflating the tires of the bicycle.

FIGS. 6 and 7 illustrate a variant in which the container for the electronic control unit includes a flattened body 31 which is set between the plate 5f or carrying the bottle-cage supporting unit and the tube 2 of the frame and which includes two holes 32 for engagement of the fixing screws. The same container 31 incorporates, on one side a sheath 33 for the batteries 13.

FIGS. 8 and 9 illustrate a further variant of the solution of FIGS. 1-3, in which the two plates 8, 9 are replaced by a single elongated plate 34 which has holes 10 for the fixing screws and is rigidly connected to the container 15 (which has the structure illustrated in FIG. 3). In this case, however, the clamps 11 are not provided, and the batteries 13 are housed in an auxiliary container 35 made beneath the main container 15.

Finally, FIGS. 10 and 11 illustrate a variant of the solution of FIGS. 8 and 9, which differs from the latter only as regards a different conformation of the bottle-cage support 4, which in this case includes a continuous containment wall 36 that is integrated in the body serving as a container for the electronic control unit.

Of course, without prejudice to the principle of the invention, the details of construction and the embodiments may vary widely with respect to what is described and illustrated herein purely by way of example, without thereby departing from the scope of the present invention.

What is claimed is:

1. A rigid containment unit for a bicycle having a frame, a bottle-cage supporting unit fixed to the frame at an anchoring point, at least one electronic device on board the bicycle, and at least one of an electronic control system and power-supply system for the electronic device, the rigid containment unit comprising a conformation suitable for being fixed in the anchoring point; wherein said bottle-cage supporting unit includes a supporting plate which can be fixed to a tube of the bicycle frame, and wherein the containment unit further comprises auxiliary supporting means associated to the bottle-cage supporting unit set between the supporting plate and the bicycle frame, and a container for the at least one of the electronic control system and power-supply system which is rigidly connected to a bottom end of said auxiliary supporting means and projects in a cantilevered fashion therefrom beneath a space designed to receive a bottle, wherein the containment unit is adaptable to attachment to the bicycle frame independently of the attachment of the bottle-cage supporting unit to the bicycle frame; and wherein said auxiliary supporting means are provided laterally with elastic clamps for anchoring an elongated sheath constituting the container for a battery for the power supply system.

2. A containment unit for a bicycle having a frame, a bottle-cage supporting unit affixed to the frame at an anchoring point wherein said bottle-cage supporting unit includes a supporting plate which can be fixed to a tube of the bicycle frame, at least one electronic device on board the bicycle, an electronic control system for said electronic device, said containment unit comprising;

a conformation suitable for being fixed to the frame at the same anchoring point as that for the bottle-cage supporting unit, said electronic control system being arranged and supported within said containment unit; and auxiliary supporting means associated with said bottle-cage supporting unit that are set between said supporting plate and the bicycle frame, and a rigid container for the electronic control system which is connected to a bottom end of said auxiliary supporting means and projects in a cantilevered fashion therefrom beneath a space designed to receive a bottle;

wherein the containment unit is adaptable to attachment to the bicycle frame independent of the attachment of the bottle-cage supporting unit to the bicycle frame; and wherein said auxiliary supporting means are provided laterally with elastic clamps for anchoring an elongated sheath constituting the container for a battery for supplying power to the at least one electronic device.

3. A bicycle frame comprising:

a bottle-cage supporting unit, having at least a bottom end, fixed to the frame at an anchoring point and including a supporting plate which can be fixed to the frame at the anchoring point, and associated auxiliary supporting means, having top and bottom ends, set between said supporting plate and the frame;

at least one electronic device on the frame;

an electronic, battery powered control operatively associated with said electronic device, housed in a rigid containment unit connected to the bottom end of said auxiliary supporting means and projecting in a cantilevered fashion beneath the bottom end of the bottle-cage supporting unit;

wherein the containment unit is adaptable to attachment to the frame independent of the attachment of the bottle-cage supporting unit to the frame; and wherein said auxiliary supporting means are provided laterally with elastic clamps for anchoring an elongated sheath constituting a container for an electric power-supply battery.

* * * * *

UNITED STATES PATENT AND TRADEMARK OFFICE
CERTIFICATE OF CORRECTION

PATENT NO. : 6,923,355 B2  Page 1 of 1
DATED : August 2, 2005
INVENTOR(S) : Valentino Campagnolo It is certified that error appears in the above-identified patent and that said Letters Patent is hereby corrected as shown below:

<u>Column 4,</u>
Line 11, after "frame" delete "independently" and insert -- independent --.

Signed and Sealed this

Twenty-first Day of March, 2006

JON W. DUDAS
*Director of the United States Patent and Trademark Office*